United States Patent
Oler et al.

(10) Patent No.: US 6,437,543 B1
(45) Date of Patent: Aug. 20, 2002

(54) METHOD AND SYSTEM FOR EXTENDING BATTERY LIFE BY MONITORING TEMPERATURE DURING CHARGING

(75) Inventors: Van Oler, Redmond; David Mai, Shoreline; Ken Kelly, Carnation, all of WA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/717,198

(22) Filed: Nov. 20, 2000

(51) Int. Cl.⁷ .............................................. H01M 10/46
(52) U.S. Cl. ....................................................... 320/150
(58) Field of Search ................................ 320/128, 150, 320/DIG. 18, DIG. 21

(56) References Cited

U.S. PATENT DOCUMENTS

| | | |
|---|---|---|
| 4,572,878 A | 2/1986 | Daugherty |
| 5,136,231 A * | 8/1992 | Faulk |
| 5,290,643 A | 3/1994 | Chen |
| 5,482,793 A | 1/1996 | Burns et al. |
| 5,504,416 A | 4/1996 | Holloway et al. |
| 5,557,188 A | 9/1996 | Piercey |
| 5,912,547 A | 6/1999 | Grabon |

* cited by examiner

*Primary Examiner*—Edward H. Tso
(74) *Attorney, Agent, or Firm*—Wagner Murabito & Hao LLP

(57) ABSTRACT

A system for controlling battery charging. The system comprises a battery charging device, a temperature sensor, and a controller. The battery may be a Lithium polymer battery, or the like. The temperature sensor senses the battery temperature and outputs a temperature data signal. The controller inputs the temperature data signal and determines if the temperature data is outside of a range with an upper limit and lower limit. If so, the controller disables the battery charging circuit, wherein the battery is prevented from being charged. In this fashion, the battery's lifetime (e.g., number of charge/discharge cycles) is extended. In another embodiment, the system further comprises a display. The controller outputs a signal to the display, directing it to display a message indicating that the battery is not being charged because the temperature is out of the predetermined range.

26 Claims, 10 Drawing Sheets

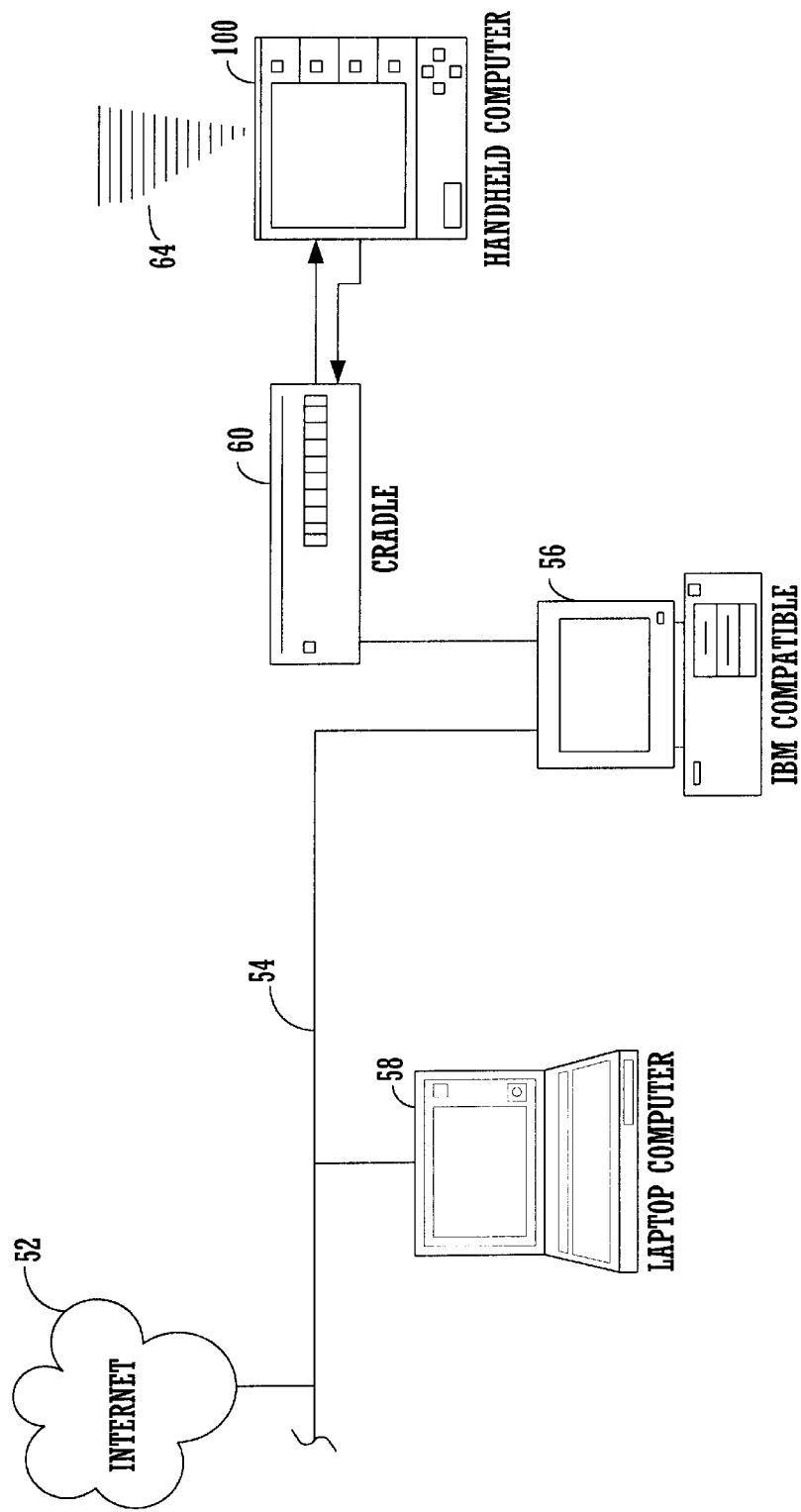

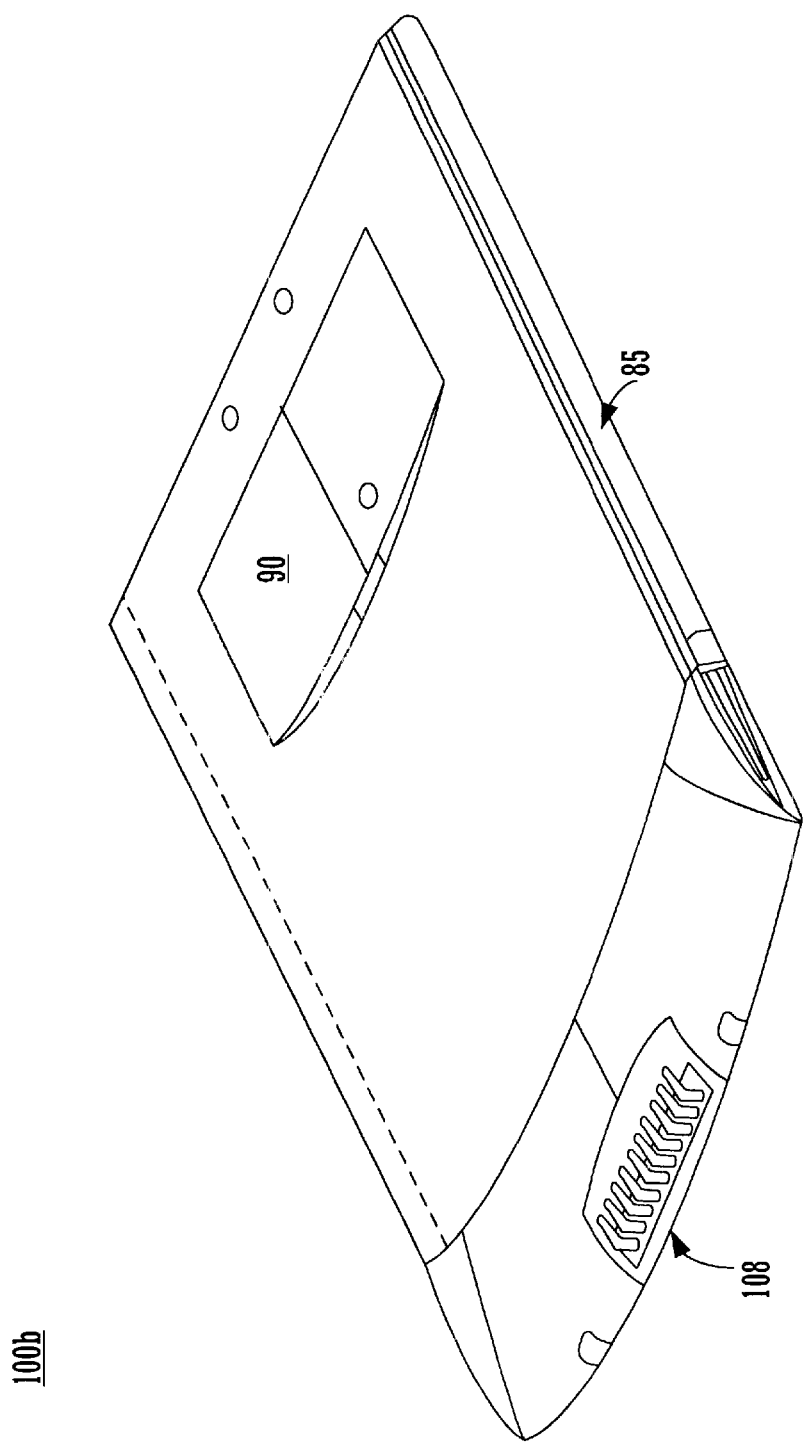

METHOD AND SYSTEM FOR EXTENDING BATTERY LIFE BY MONITORING TEMPERATURE DURING CHARGING

FIELD OF THE INVENTION

The present invention relates to the field of battery charging. Specifically, the present invention relates to a method and system for extending battery life by preventing charging when the battery's temperature is out of an acceptable range.

BACKGROUND ART

Two significant problems occur if a battery is charged outside of a suitable temperature range. First, the number charge/discharge cycles the battery is capable of is reduced. For example, charging Lithium polymer batteries below zero or above 40 degrees Celsius reduces lifetime. Batteries other than Lithium polymer are affected by this phenomena as well. Secondly, charging at too high a temperature can damage the battery or even cause the battery to explode. For example, a Lithium polymer battery may explode if charged above 90 degrees Celsius.

A conventional system for monitoring a battery's temperature is described in U.S. Pat. No. 5,557,188. That patent describes a method of protecting against charging or discharging a battery when the temperature is too high. If a temperature sensor detects that the battery's temperature is too high, a charging circuit is broken, thus disconnecting the battery from the power supply and the device the battery powers. Unfortunately, the battery may not be used to power an electronic device when the temperature is out of range because the path between the battery and the electronic device is broken when the charging circuit is broken. Additionally, the temperature sensor is disclosed as only monitoring for a temperature which is above a certain range. However, Lithium polymer batteries may have their lifetime's reduced if charged when the temperature is too low.

With other conventional systems, the charging current supplied to the battery is reduced as the battery's temperature increases. Unfortunately, these systems are not well-adapted for batteries such as Lithium polymer, which do not need to have the charging current reduced as the battery's temperature rises. Consequently, the time to charge a Lithium polymer battery may be unnecessarily increased when using such a conventional system.

Some conventional systems display a symbol to indicate that a battery is being charged. However, if the battery is not being charged because the temperature is out of range, these conventional systems do not explain why the battery is not being charged. In some cases, the user of the electronic device could rectify the temperature problem if the user knew what the problem is. However, the problem may not be rectified due to lack of notification.

SUMMARY OF THE INVENTION

Therefore, it would be advantageous to provide a method and system for preventing a battery from charging while its temperature is outside of an acceptable range. A further need exists for such a method and system which detects both an upper and a lower temperature bound. A still further need exists for such a method and system which provides a charging current to the battery which is independent of the battery's temperature over the acceptable temperature range. A still further need exists for such a method and system in which the battery may be used to power, for example, a portable electronic device, even if the temperature is out of range and battery charging is disabled. A still further need exists for such a method and system which displays a message explaining that the battery is not charging because the battery temperature is outside of an acceptable charging range.

The present invention provides a method and system for preventing a battery from charging while its temperature is outside of an acceptable range. Embodiments provide for such a method and system which detects both an upper and a lower temperature bound. Embodiments provide for such a method and system which provides a charging current to the battery which is independent of the battery's temperature. Embodiments provide for such a method and system in which the battery may be used to power, for example, a portable electronic device, even if the temperature is out of range and battery charging is disabled. Embodiments provide for such a method and system which displays a message explaining that the battery is not charging because the temperature is outside of an acceptable charging range. The present invention provides these advantages and others not specifically mentioned above but described in the sections to follow.

A method and system for controlling battery charging is disclosed. One embodiment provides for a system comprising a battery charging device, a temperature sensor, and a controller. The battery may be a Lithium polymer battery, or the like. The temperature sensor senses the battery temperature and outputs a temperature data signal. The controller inputs the temperature data signal and determines if the battery's temperature is outside of a range with an upper limit and lower limit. If so, the controller disables the battery charging circuit, wherein the battery is prevented from being charged. In this fashion, the battery's lifetime (e.g., number of charge/discharge cycles) is extended.

In another embodiment, the system further comprises a display. The controller outputs a signal to the display, directing it to display a message indicating that the battery is not being charged because the temperature is out of a pre-determined range. The message may indicate whether the temperature is too high or too low, in one embodiment.

In yet another embodiment, the battery remains electrically connected to a portable electronic device while the battery charging circuit is disabled from charging. Therefore, the battery may power the portable electronic device while the battery charging circuit is disabled from charging. The portable electronic device may be, for example, a personal digital assistant.

Another embodiment provides for a method of controlling battery charging. The method first monitors the temperature of a battery. Next, the method determines whether the temperature is outside of a range with an upper limit and a lower limit. Then, if the temperature is outside of the range, a battery charging device is disabled. Therefore, the battery is prevented from being charged.

BRIEF DESCRIPTION OF THE DRAWINGS

FIG. 1 is system illustration of an exemplary PDA computer system connected to other computer systems and a modem via a cradle device.

FIG. 2B is a bottom side perspective view of the exemplary PDA computer system of FIG. 2A.

DETAILED DESCRIPTION OF THE INVENTION

Figure 2A:
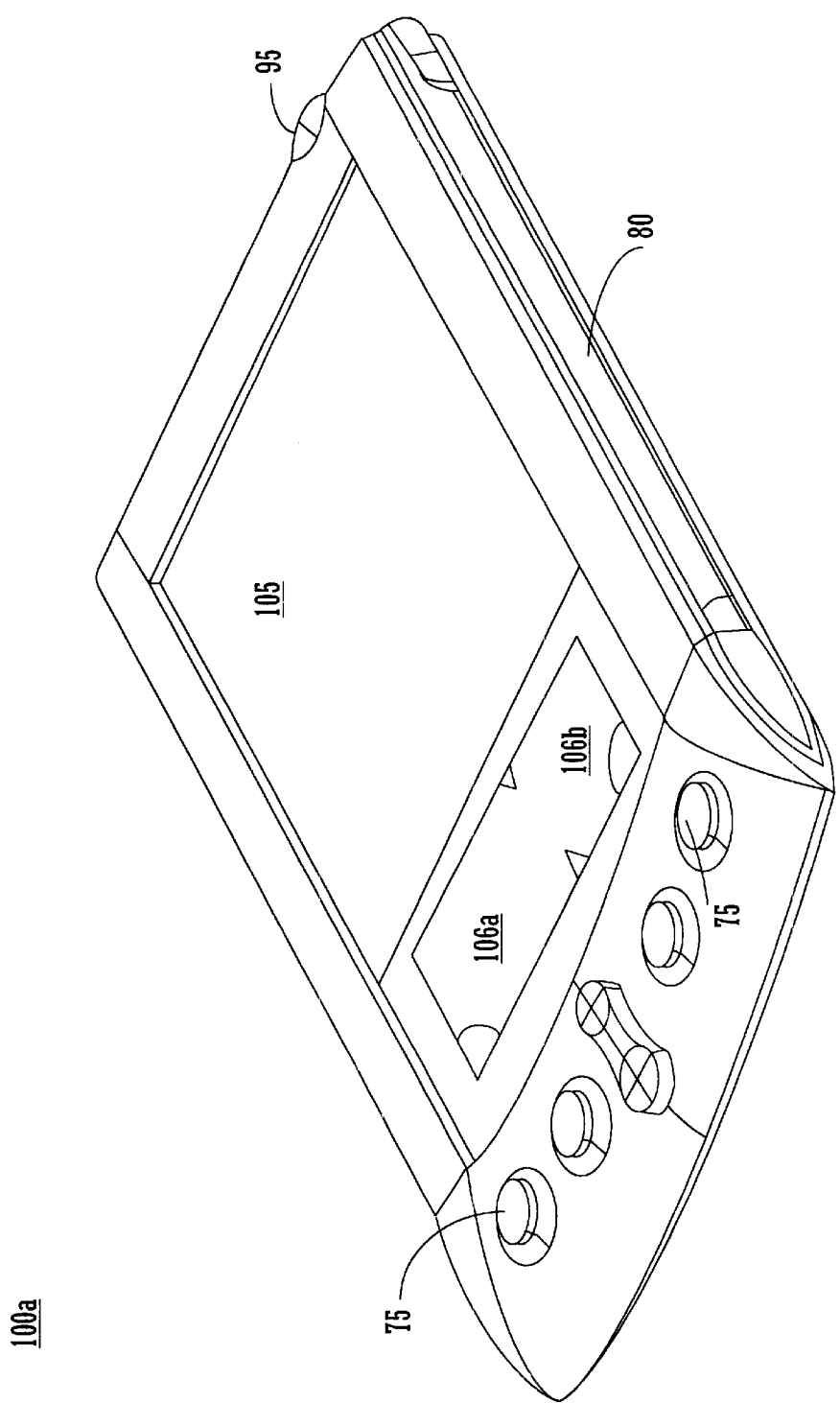
FIG. 2A is a top side perspective view of an exemplary PDA computer system.

In the following detailed description of the present invention, a method and system for preventing a battery from charging while its temperature is outside of a predetermined range, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EXEMPLARY PERSONAL DIGITAL ASSISTANT PLATFORM

One embodiment of the present invention monitors the charging of the battery of a PDA. An exemplary PDA platform is presented. However, it will be understood that the present invention is well-suited to operating with other electronic devices, for example, cell phones, pagers, webbrowsers, etc. FIG. 1 illustrates a system 50 that can be used in conjunction with various embodiments of the present invention. It is appreciated that the present invention can operate with a variety of host computers and that system 50 is merely exemplary. System 50 comprises a host computer system 56 which can be a desktop unit as shown or a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant (PDA) 100, which may serve as the host computer system. The PDA 100 may be a palm top ("palm-sized") portable computer system, an intelligent cellular telephone, or the like. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

FIG. 2A is a perspective illustration of the top face 100a of one embodiment of the exemplary PDA computer system 100. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

FIG. 2B illustrates the bottom side 100b of one embodiment of the exemplary PDA computer system 100 that can be used in accordance with various embodiments of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 3:
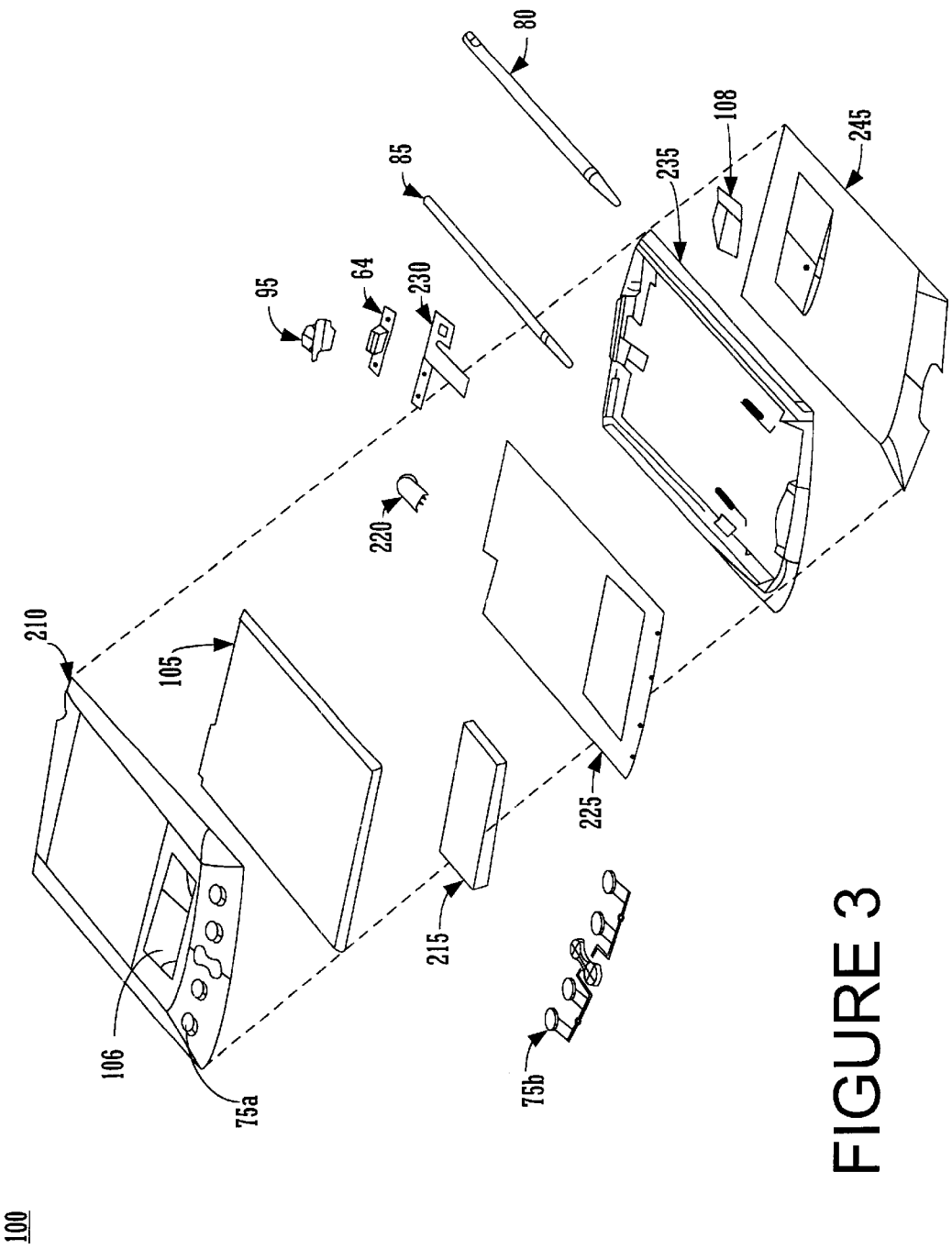
FIG. 3 is an exploded view of the components of the exemplary PDA computer system of FIG. 2A.

FIG. 3 is an exploded view of the exemplary PDA computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A mid-frame 235 is shown along with stylus 80. Position adjustable antenna 85 is shown.

A radio receiver/transmitter device 240 is also shown between the mid-frame and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet 52 via a proxy server.

Figure 4:
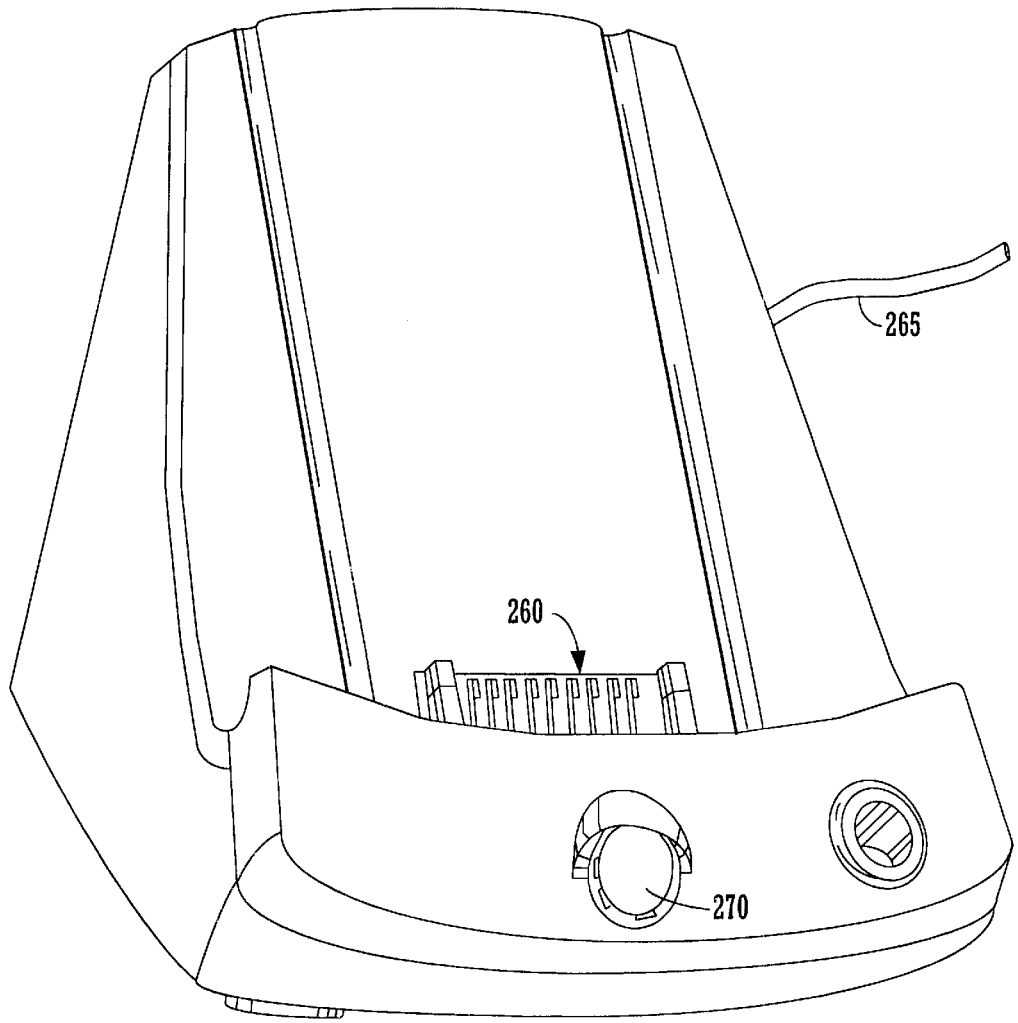
FIG. 4 is a perspective view of the cradle device for connecting the exemplary PDA computer system to other systems via a communication interface.

FIG. 4 is a perspective illustration of one embodiment of the cradle 60 for receiving the exemplary PDA computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems or to a modem 53a coupled to serial communication 265. In one embodiment, the battery 215 is charged by inserting the PDA 100 into the cradle 60, which is connected to a power source.

Figure 5:
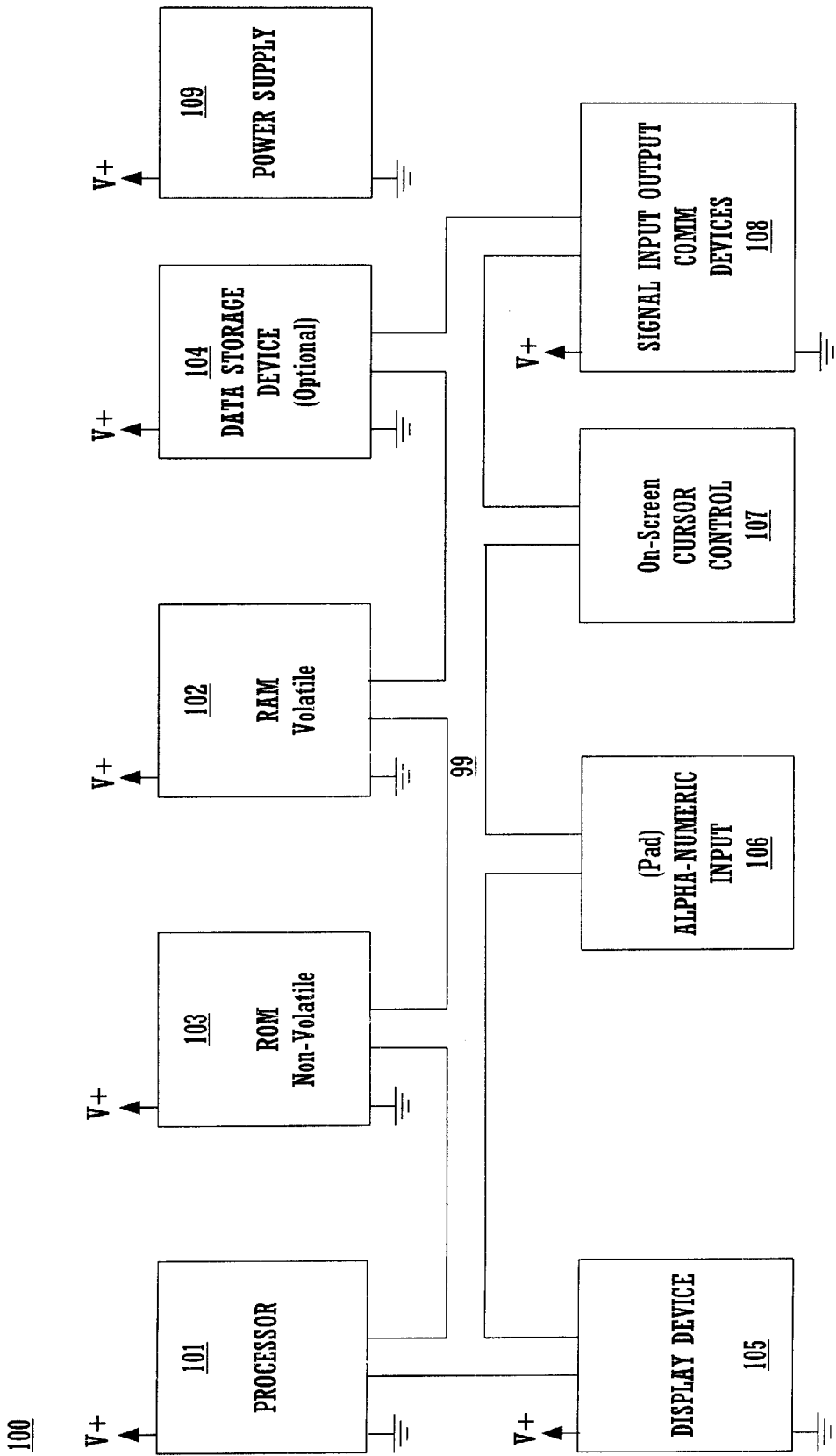
FIG. 5 is a logical block diagram of the exemplary PDA computer system, which may be used as a platform for embodiments of the present invention.

FIG. 5 illustrates circuitry of computer system 100, some of which can be implemented on PC board 225. Portions of the circuitry may also be used for computer system 56, 58. In particular, the processor 101, ROM 103, RAM 102, and bus 99 may form a platform for those systems. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a nonvolatile memory 103 (e.g., read only memory ROM) coupled with the bus 99 for storing static information and instructions for the processor 101. Computer system 100 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 100 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 100 also includes an optional cursor control or directing device 107 coupled to the bus 99 for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 99, can be a serial port for communicating with the cradle 60. Device 108 can also include an infrared communication port. A power supply 109, which may contain a battery 215 and a charging circuit (FIG. 7, 704) provides regulated voltages for the other circuits in FIG. 5.

Figure 6A:
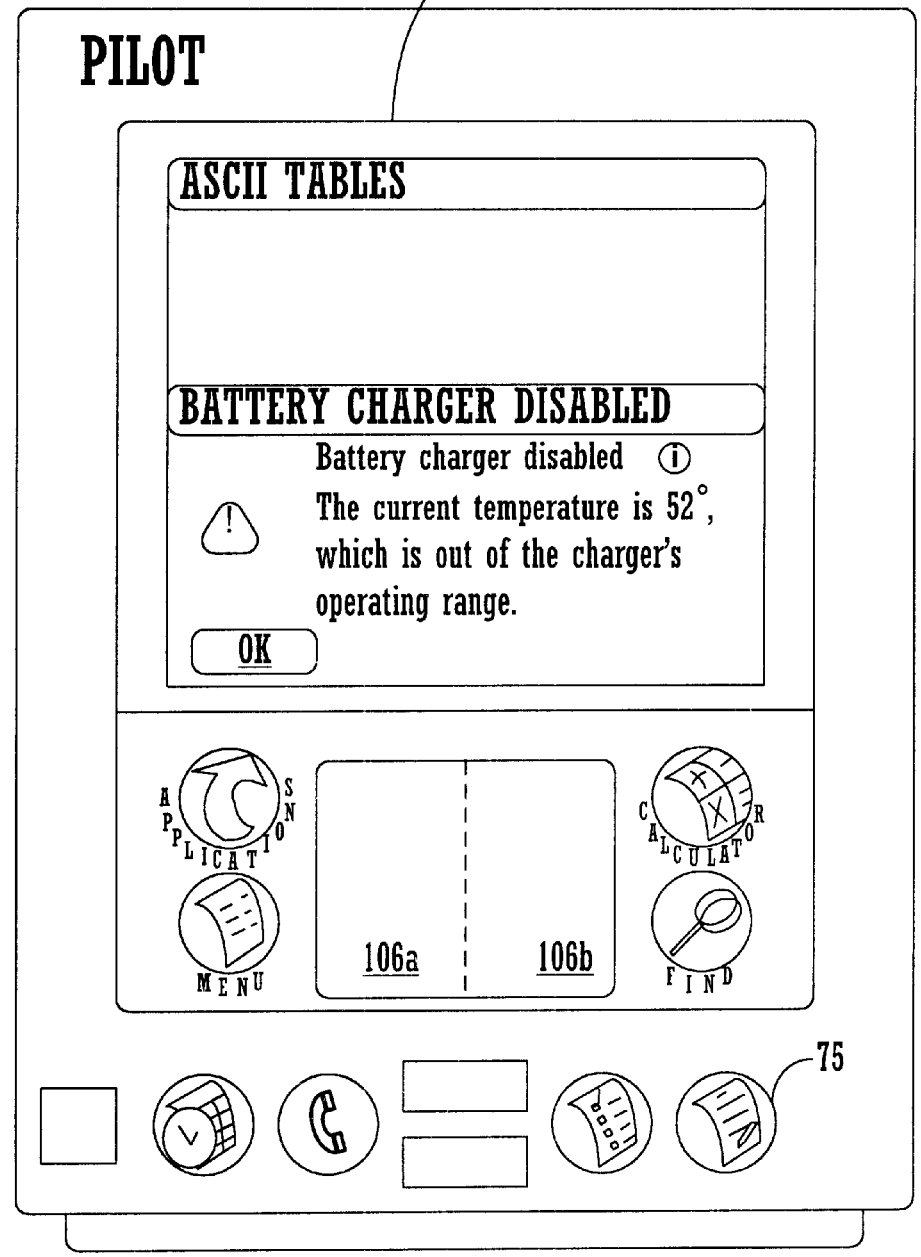
FIG. 6A and FIG. 6B each illustrate a front view of an exemplary PDA computer system illustrating the display screen, digitizer regions, and an exemplary message regarding battery charging, in accordance with an embodiment of the present invention.
Figure 6B:
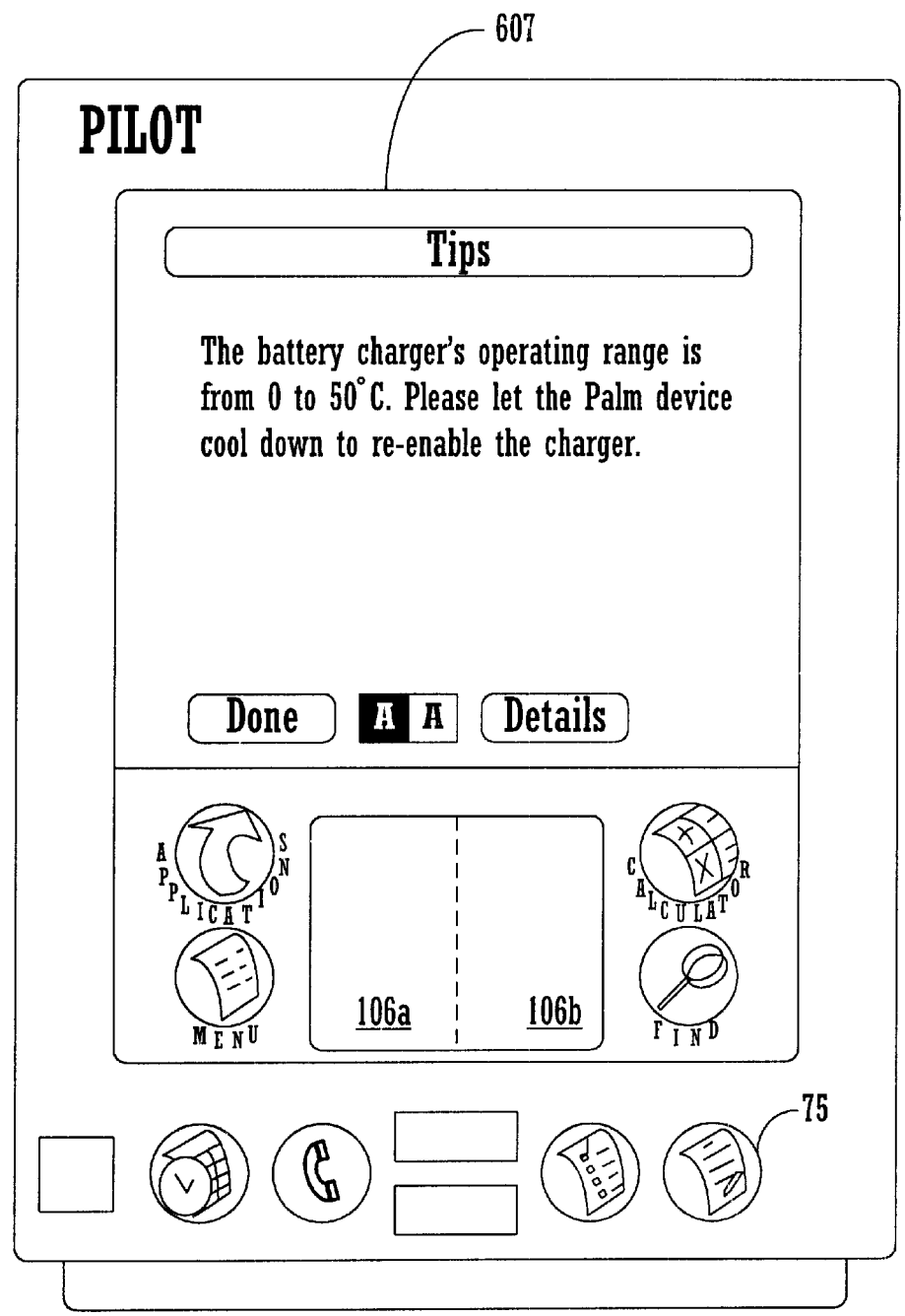

FIG. 6A is a front. view of the exemplary PDA computer system 100 with an exemplary message 607 that the battery is not being charged because the temperature is outside of an acceptable range. The present invention is well-suited to displaying the warning message in a variety of formats, such as a graphical display (e.g., thermometer), alphabetical characters, etc. Also shown are two regions of digitizer 106a and 106b. FIG. 6B shows another exemplary message 607 directing the user to take action to re-enable battery charging. Region 106a is for receiving user stroke data for alphabet characters, and typically not numeric characters, and region 106b is for receiving user stroke data for numeric data, and typically not for alphabetic characters. Physical buttons 75 are also shown. Although different regions are shown for alphabetic and numeric characters, the present invention is also operable within a single region that recognizes both alphabetic and numeric characters.

METHOD AND SYSTEM FOR EXTENDING BATTERY LIFE BY MONITORING TEMPERATURE DURING CHARGING

The present invention provides for a method and system for extending battery life by disabling battery charging while the battery temperature is outside an acceptable range. Embodiments detect both a high and a low temperature bound, display a warning to the user if the battery is not charging due to temperature concerns, and allow the battery to power an electronic device even if the battery charger is disabled.

Figure 7:
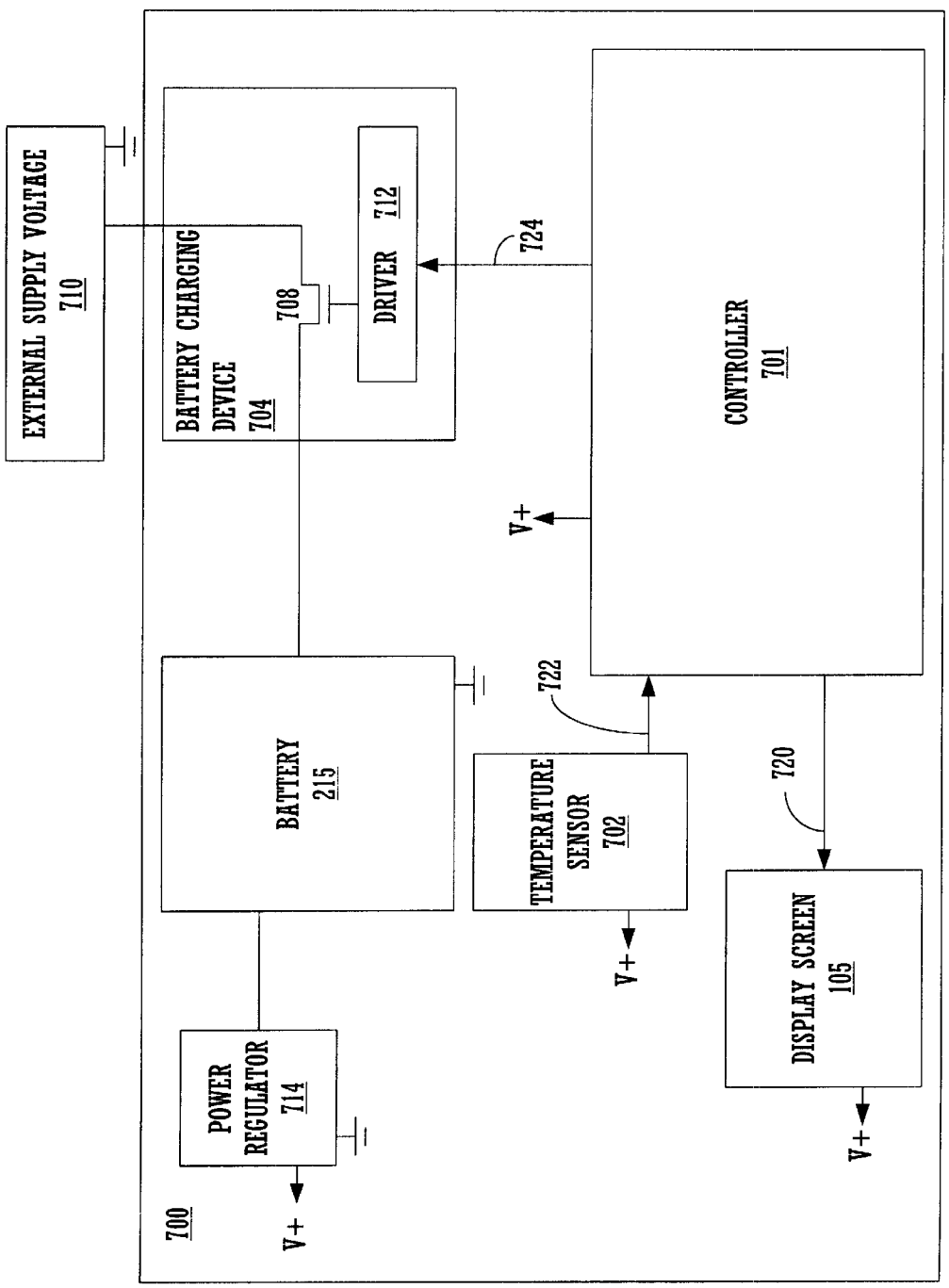
FIG. 7 is an logical block diagram of a system for monitoring battery temperature during charging, in accordance with an embodiment of the present invention.

FIG. 7 illustrates a system 700 for monitoring battery temperature to extend battery life. Parts, or all, of system 700 may reside within PDA 100 or within 15 a portable electronic device, such as a cell phone, pager, web-browser, etc. The system 700 comprises a temperature sensor 702, which is located in close proximity to the battery 215. The temperature sensor 702 outputs a digital signal 722 to the controller 701. The temperature sensor device may have a diode which is sensitive to changes in temperature. The voltage drop across the diode is proportional to the temperature. However, the present invention is not limited to using a temperature sensing diode, as the present invention is well-suited to operating with devices such as thermistors or the like. An analog to digital converter within the temperature sensing device 702 converts the voltage signal for output. However, the analog to digital conversion need not take place within the temperature sensing device 702, which may be an ADS7846 touch screen controller manufactured by Burr-Brown, Tucson, Ariz., or the like.

The controller 701 may be implemented with the processor 101 and the memory (102, 103) of the PDA 100. The controller 701 outputs a charge enable signal 724 to the battery charger 704. Additionally, the controller 701 inputs the digital signal 722 from the temperature sensor 702 and checks for both an upper limit and a lower limit. If the temperature is outside of the range, the controller 701 disables the battery charging device 704, thus preventing it from charging the battery 215. In one embodiment, this is accomplished by not issuing the charge enable signal 724 to the battery charging device 704. However, the present invention is well-suited to issuing a disable signal (not shown) to the battery charger 704.

In one embodiment, the battery charger 704 has a transistor 708 which connects to the positive terminal of an external power supply 710 and to the battery 215. In one embodiment, the battery 215 is a Lithium polymer battery; however, the present invention is not limited to such batteries. In the PDA 100 example, the external power supply 710 may be connected to in a variety of ways, such as the cradle device 60, an adapter to a cars cigarette lighter (not shown), or a standard wall outlet via an adapter (not shown). The gate of the transistor 708 is connected to controller 701 via a driver 712, which provides sufficient voltage to turn on transistor 708, thus connecting the supply voltage 710 to the battery 215. When the battery charging device 704 is not enabled by the controller 701, the transistor 708 is off, and the supply voltage 710 is not connected to the battery 215. Importantly, the battery 215 is directly connected to the power regulator 714, which supplies an input voltage to the electronic device (e.g., PDA 100). In this fashion, the battery 215 is able to power the PDA 100 even while the battery charging device 704 is disabled by the controller 701. This is important as, in one embodiment, the voltage source 710 is isolated from the PDA 100 when the charging circuit 704 is disabled. It will be understood that the battery charging circuit 704 shown is exemplary and simplified, and that a variety of charging circuit 704 designs may be used, such that battery 215 charging does not take place while the charging circuit 704 is disabled.

The controller 701 also outputs a signal or message 720 directing the display 105 to display a message that the battery 215 is not being charged because the temperature is either too high or too low. The displayed message may take any suitable form.

Figure 8:
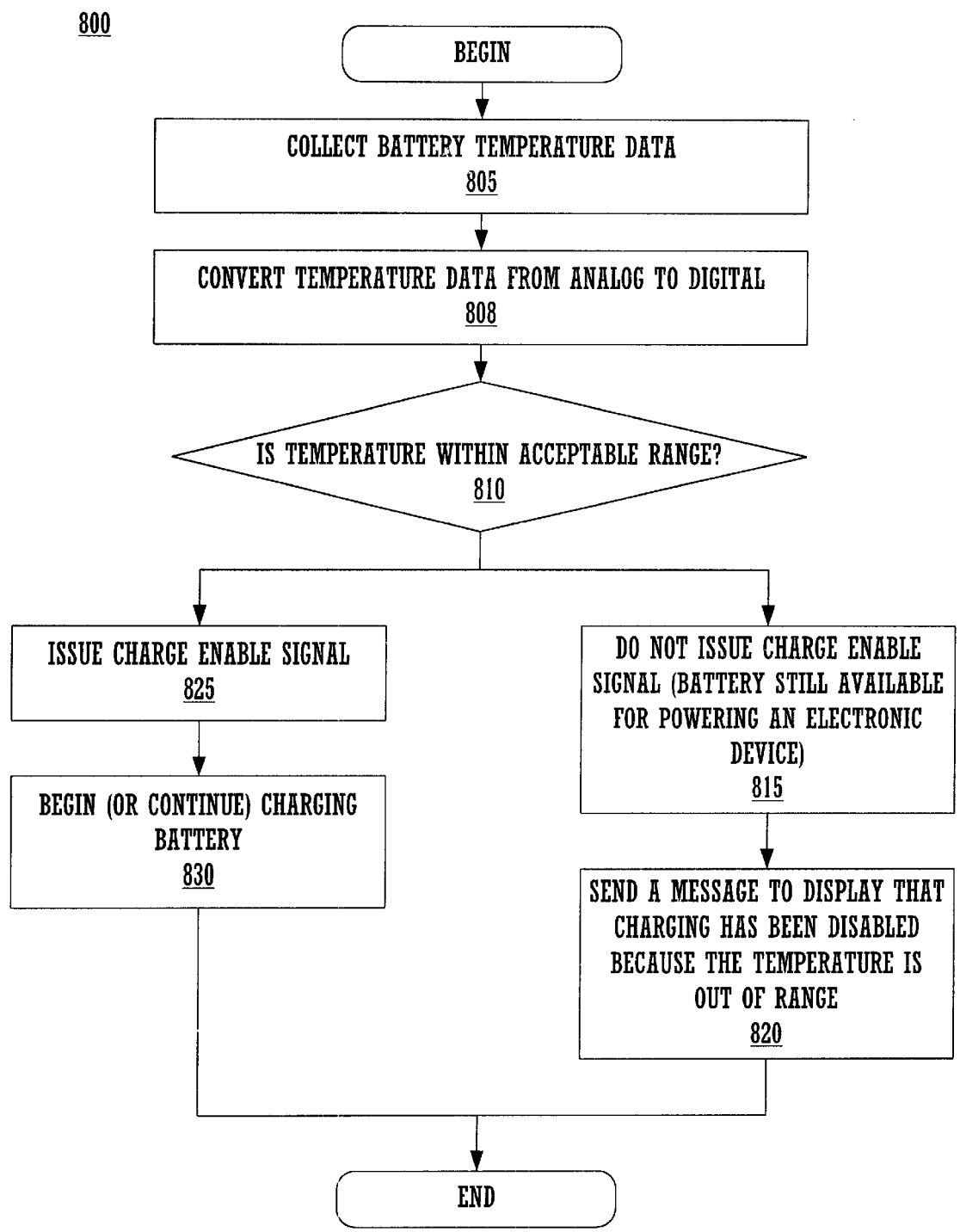
FIG. 8 is a flowchart illustrating the steps of a process of monitoring battery temperature during charging, in accordance with an embodiment of the present invention.

The steps of a process 800 for preventing charging a battery 215 outside of an acceptable temperature range are illustrated in FIG. 8. In step 805, a temperature sensor 702 reads the temperature of the battery 215. This step may be performed just before battery 215 charging is to be started and may also be performed periodically while charging is taking place. In step 808, the analog temperature data is converted to digital and sent to the controller 701.

In step 810, a controller 701 determines whether the temperature is within an acceptable range. Unlike some conventional systems which only check for an upper limit, the present embodiment checks for both an upper and a lower limit. In one embodiment, the upper limit is 45 degrees Celsius and the lower limit is zero degrees Celsius. However, other limits may be used. Furthermore, the limits need not be fixed, but may be changed to suit the battery 215 characteristics, in one embodiment.

If the temperature is outside of an acceptable range, the process 800 disables the battery charging device 704, in step 815. However, the battery 215 remains electrically connected to the PDA 100 so that it may be powered. The battery charger 704 may be disabled in any suitable fashion, for example, by not sending a signal which enables the battery charging device 704.

In step 820, the controller 701 sends a signal 720 to the display 105 indicating that the battery 215 is not being charged due to the temperature condition. In one embodiment, a symbol such as a thermometer is displayed. In another embodiment, an indication of whether the temperature is too high or too low is displayed.

If step 81 0 determined that the temperature is within range, the controller 701 enables the charging circuit 704, in step 825. For example, the controller 701 issues a charge signal 724 to the battery charger 704. The present embodiment provides for an all-or-nothing charger. For example, the current supplied to the battery 215 is independent of the sensed battery 215 temperature throughout the acceptable temperature range.

In step 830, the battery charger 704 begins or continues charging the battery 215. The process 800 repeats (e.g., continues to monitor the temperature) at a suitable interval so as to not consume excessive processor 101 cycles, but to safely monitor battery 215 temperature.

For batteries such as Lithium polymer, the danger of explosion may become substantial at about 90 degrees Celsius. Therefore, in addition to extending battery life, embodiments of the present invention prevent damage to the battery 215, including preventing possible explosion, by disabling charging while the temperature is outside an acceptable range.

The preferred embodiment of the present invention, a method and system for extending battery life by preventing charging while the battery's temperature is outside of an acceptable range, is thus described. While the present invention has been described in particular embodiments, it should be appreciated that the present invention should not be construed as limited by such embodiments, but rather construed according to the below claims.

We claim:

1. A system for controlling battery charging comprising:
a battery charging device operable to charge said battery;
a device operable to sense the temperature of said battery and operable to output a temperature data signal; and
a controller operable to input said temperature data signal, to determine if said temperature data is outside of a range with an upper limit and lower limit, and to disable said battery charging device while said temperature is out of said range, wherein said battery is prevented from being charged while said temperature is out of said range, wherein said battery remains electrically connected to a portable electronic device while said battery charging circuit is disabled from charging, and wherein said battery is operable to power said portable electronic device while said battery charging circuit is disabled from charging.

2. The system of claim 1 further comprising a display device; and wherein
said controller is further operable to direct said display device to display a message indicating that said battery is not being charged because said temperature is out of said range.

3. The system of claim 1 wherein said battery is a Lithium polymer battery.

4. The system of claim 1 wherein said portable electronic device is a personal digital assistant.

5. The system of claim 1 wherein said controller resides within a portable electronic device.

6. The system of claim 1 wherein said temperature data signal is a digital signal.

7. The system of claim 1 wherein said lower limit is zero degrees Celsius and said upper limit is 45 degrees Celsius.

8. The system of claim 1 wherein said battery charger is further operable to supply a current to said battery which is substantially independent of the sensed battery temperature.

9. A system for controlling battery charging comprising:
a battery charging device operable to charge said battery;
a device operable to sense the temperature of said battery and operable to output a temperature data signal; and
a controller operable to input said temperature data signal, to determine if said temperature data is outside of a range with an upper limit and lower limit, and to disable said battery charging device while said temperature is out of said range, wherein said battery is prevented from being charged while said temperature is out of said range, wherein said battery charger is further operable to supply a current to said battery which is substantially independent of the sensed battery temperature.

10. The system of claim 9 further comprising a display device; and wherein
said controller is further operable to direct said display device to display a message indicating that said battery is not being charged because said temperature is out of said range.

11. The system of claim 9 wherein said battery is a Lithium polymer battery.

12. The system of claim 9 wherein said controller resides within a portable electronic device.

13. The system of claim 9 wherein said temperature data signal is a digital signal.

14. The system of claim 9 wherein said lower limit is zero degrees Celsius and said upper limit is 45 degrees Celsius.

15. A method of controlling battery charging comprising:
a) monitoring the temperature of a battery;
b) determining whether said temperature is outside of a range with an upper limit and a lower limit;
c) if said temperature is outside of said range, disabling a battery charging device, wherein said battery is prevented from being charged; and
d) powering a portable electronic device with said battery while said battery charging device is disabled.

16. The method of claim 15 further comprising:
e) displaying a message on a display screen of a portable electronic device indicating that said battery is not being charged because said temperature is outside of said range.

17. The method of claim 16 wherein said portable electronic device is a personal digital assistant.

18. The method of claim 16 wherein e) comprises:
e1) displaying a message on a display screen of a portable electronic device indicating that said battery is not being charged because said temperature is above said upper limit.

19. The method of claim 16 wherein e) comprises:
e1) displaying a message on a display screen of a portable electronic device indicating that said battery is not being charged because said temperature is below said lower limit.

20. A computer system comprising:
a display screen;
a battery charging circuit operable to charge a battery;
a temperature sensor operable to sense the temperature of said battery and to output a temperature data signal; and
an intelligent controller coupled to said display screen and coupled to said battery charging circuit, said intelligent controller comprising a processor coupled to a bus and a memory unit containing instructions that when executed implement a method of controlling battery charging comprising:
a) receiving said temperature data signal;
b) determining if said battery temperature is outside of a range with an upper limit and lower limit; and
c) disabling said battery charging circuit while said temperature is out of said range, wherein said battery is directly connected to an electrical power input of said computer system, and wherein said battery is operable to power said computer system while said battery charging circuit is disabled.

21. The computer system of claim 20 in which said computer system is a personal digital assistant.

22. The computer system of claim 20:
wherein said method further comprises:
d) directing said display to display a message indicating that said battery is not being charged because said temperature is out of said range.

23. The computer system of claim 20 wherein:
said battery charging circuit is further operable to supply a current to said battery which is substantially independent of the sensed battery temperature.

24. A computer system comprising:
a display screen;
a temperature sensor operable to sense the temperature of a battery and to output a temperature data signal;
a battery charging circuit operable to charge said battery and to supply a current to said battery which is substantially independent of the sensed battery temperature; and
an intelligent controller coupled to said display screen and coupled to said battery charging circuit, said intelligent controller comprising a processor coupled to a bus and a memory unit containing instructions that when executed implement a method of controlling battery charging comprising:
a) receiving said temperature data signal;
b) determining if said battery temperature is outside of a range with an upper limit and lower limit; and
c) disabling said battery charging circuit while said temperature is out of said range.

25. The computer system of claim 24 in which said computer system is a personal digital assistant.

26. The computer system of claim 24:
wherein said method further comprises:
d) directing said display to display a message indicating that said battery is not being charged because said temperature is out of said range.

* * * * *